United States Patent [19]
Bourbigot et al.

[11] Patent Number: 5,460,723
[45] Date of Patent: Oct. 24, 1995

[54] SURFACE WATER PROCESSING INSTALLATION WITH SAFETY BARRIER

[75] Inventors: Marie-Marguerite Bourbigot, Garches; Michel Faivre, Acheres; Jacques Sibony, Paris; Pierre Corsin, Rocquencourt, all of France

[73] Assignee: Omnium de Traitement et de Valorrsation (OTV) S.A., Courbevoie Cedex, France

[21] Appl. No.: 983,842
[22] PCT Filed: Jun. 25, 1992
[86] PCT No.: PCT/FR92/00575
§ 371 Date: Feb. 18, 1994
§ 102(e) Date: Feb. 18, 1994
[87] PCT Pub. No.: WO93/00300
PCT Pub. Date: Jan. 7, 1993

[30] Foreign Application Priority Data
Jun. 26, 1991 [FR] France .................... 91 08138

[51] Int. Cl.⁶ ................ B01D 61/16; B01D 61/22
[52] U.S. Cl. ............ 210/639; 210/96.2; 210/202; 210/259; 210/650; 210/663; 210/806
[58] Field of Search ............. 210/85, 94, 96.1, 210/96.2, 143, 198.1, 202, 259, 433.1, 434, 600, 601, 614, 631, 663, 669, 739, 745, 790, 804, 806, 764, 263, 662, 650, 651, 630, 758; 422/101; 436/177, 146; 73/863, 23

[56] References Cited

U.S. PATENT DOCUMENTS

| | | | |
|---|---|---|---|
| 3,770,623 | 11/1973 | Seidel | 210/806 |
| 3,838,774 | 1/1974 | Dolan et al. | 210/85 |
| 4,610,792 | 9/1986 | Van Gils et al. | 210/650 |
| 4,787,980 | 11/1988 | Ackermann et al. | 210/638 |
| 5,039,416 | 8/1991 | Loew et al. | 210/631 |
| 5,059,317 | 10/1991 | Marius et al. | 210/259 |
| 5,174,901 | 12/1992 | Smith | 210/806 |

FOREIGN PATENT DOCUMENTS

| | | | |
|---|---|---|---|
| 0104648 | 4/1984 | European Pat. Off. | |
| 0250019 | 12/1987 | European Pat. Off. | |
| 2236792 | 8/1974 | France | |
| 54031088 | 5/1979 | Japan | |
| 2155998 | 7/1987 | Japan | 210/631 |
| 3151399 | 6/1988 | Japan | 210/631 |
| 8905778 | 6/1989 | WIPO | 210/601 |

OTHER PUBLICATIONS

Kawabe et al, "Instrumentation and Automation Systems for Waterworks", Toshiba Review, No. 133, May–Jun. 1981, 210-143.

C. C. Ruchhoft, "The Possibilities of Disposal of Radioactive Wastes by Biological Treatment Methods", Seminar on Disposal of Radioactive Wastes, U.S. Atomic Energy Commission, Washington D.C. Jan. 24–25, 1949, pp. 877, 210-601.

(List continued on next page.)

Primary Examiner—Joseph W. Drodge
Attorney, Agent, or Firm—Merchant, Gould, Smith, Edell, Welter, & Schmidt

[57] ABSTRACT

A plant for the treatment of surface water comprises a safety barrier mounted at the exit from the treatment plant and constituted by a physical filter providing, at the exit from the filter, a predetermined minimum quality irrespectively of the quality of the water on entry into the filter, and a pre-treatment installation located upstream from thè safety barrier, the treatment intensity of the pre-treatment installation being adjusted as a function of the characteristics of the surface water to be treated through measuring devices located at the entrance to the physical barrier. The safety barrier is advantageously a nanofiltration membrane, coupled if necessary to one or more reverse osmosis membranes mounted downstream in "series-rejection" mode. The disclosed installation can be applied to the treatment of water liable to show great variability in quality, notably to the treatment of surface water or of water with equivalent characteristics.

25 Claims, 2 Drawing Sheets

OTHER PUBLICATIONS

Journal Water Pollution Control Federation vol. 59, No. 7, Jul. 1987, Alexandria, Va., pp. 772–732. S. E. Rogers et al.: 'Organic Contaminants Removal for Potable Reuse'.

Desalination vol 66, No. 1, Dec. 1987, Amsterdam, pp. 423–430; H. Alrqobah et al.: 'Optimization of Chemical Pretreatment for Reverse Osmosis (RO) Seawater Desalination'.

Desalination vol. 77, No. 1–3, Mar. 1990, Amsterdam, pp. 73–84; R. Rautenbach et al.: 'Separation Potential of Nanofiltration Membranes'.

Fig. 5

SURFACE WATER PROCESSING INSTALLATION WITH SAFETY BARRIER

The field of the invention is that of installations for the filtering and purification of liquids, notably for the treatment of water.

The installation of the invention can be applied more particularly, but not exclusively, to the treatment of types of water liable to show great variability of quality, notably surface water or water with equivalent characteristics. However, those skilled in the art could envisage using the principle of the invention for the treatment of waste water or raw water in other steps in the purification plant, or for the treatment of other liquids.

The treatment of surface water is carried out in order to clarify run-off water or discharged water feeding a natural reservoir (such as water tables, streams or rivers) as well as to provide for the direct distribution of water for consumption. In the light of the presently prevailing standards, the treatment has the following main goals:

the elimination of suspended solids;

the elimination of organic matter;

the elimination of undesirable ions;

sterilization.

The organic and/or ionic pollutants or contaminants to be eliminated include hydrocarbons as well as certain halogenic organics. A circular dated 16th May 1989, sent by the Direction General de Santé (the French Department of Health) to regional and district officials, thus stresses the fact that the presence of halogenic organics had been revealed, from the 1970s onwards, in treated water for human consumption. Trichloroethylene has also been identified in water tables. According to this circular, the studies carried out in different countries, including France, with a view to a better understanding of these substances and of the related risks has led to the setting up of standards and recommendations:

the EEC directive 80/778 dated 15th Jul. 1980 of the European Communities Council comprises a general recommendation which states that for "other organochlorine compounds" that are not covered by the parameter No. 55, with a guide level of one microgram per liter, the haloform concentration should be reduced to the greatest possible extent.

the provisions published in 1984 by the World Health Organization on the quality of water intended for human consumption comprises guide values that should enable the Member States to fix national limit values of content for certain products.

According to the World Health Organization, the following values are notably recommended as the limit values of concentration of these products in water for human consumption.

carbon tetrachloride: . . . 3 micrograms per liter 1,2-dichloroethane: . . . 10 micrograms per liter tetrachloroethane: . . . 10 micrograms per liter trichloroethylene: . . . 30 micrograms per liter chloroform: . . . 30 micrograms per liter chloromethane: . . . 30 micrograms per liter A conventional water treatment plant most usually comprises a succession of physical/chemical steps of the coagulation-flocculation/settling/filtration (notably sand filtration) type.

Following the filtering operation, the water is rid conventionally of pathogenic micro-organisms, microcontaminants, traces of heavy metals, unwholesome odors and flavors by means of oxidizing agents (ozone, chlorine etc.) or ultraviolet radiation, generally coupled with a refining treatment by active carbon in granular or powder form.

To eliminate microcontaminants, there also exist other special treatments such as air stripping (forced aeration) or again filtration through a sand formed by electrically charged resin beads acting as ion collectors. These sands are very useful for water softening (decarbonization, desulfurization etc.) but have little efficiency for example with respect to chlorides or, again, with respect to organic matter.

The ozone/carbon approach is relatively efficient when the quality of raw water to be treated is known and stable However, these techniques have limitations.

ozonization is efficient for the elimination of ethylenic, chlorinated solvents like tetrachloroethylene. By contrast, it has only very limited effect or no effect on the THM substances (chloroform, dichlorobromethane, dibromochloromethane and bromoform). Furthermore, the ozone rates needed to oxidize the ethylenic compounds are high and therefore entail a major cost. Couplings with oxidizing agents (ozone/UV and ozone/$H_2O_2$) may be used for certain chlorine solvents having at least one C—H bond with variable rates of efficiency;

treatment by granular active carbon (G.A.C.) consists in adsorbing the molecules of chlorinated solvents dissolved in water by filtration on an open filter or on a filter under pressure. However, the efficiency of an active carbon depends on the nature of the chlorine compound to be eliminated and on its concentration. The lower the polarity of the molecule and the smaller its size, the less will it be adsorbed by the active carbon.

Furthermore, these treatment operations are difficult to regulate in the case of high variability in the quality of the raw water. In this case, the reagent content should indeed be readjusted constantly, for example to the microcontaminant content so as to optimize the treatment. Insufficient treatment is unacceptable, and an excessive reagent content is anti-economical and even dangerous.

Now, high variability in quality is frequently encountered in surface water.

Figure 1:
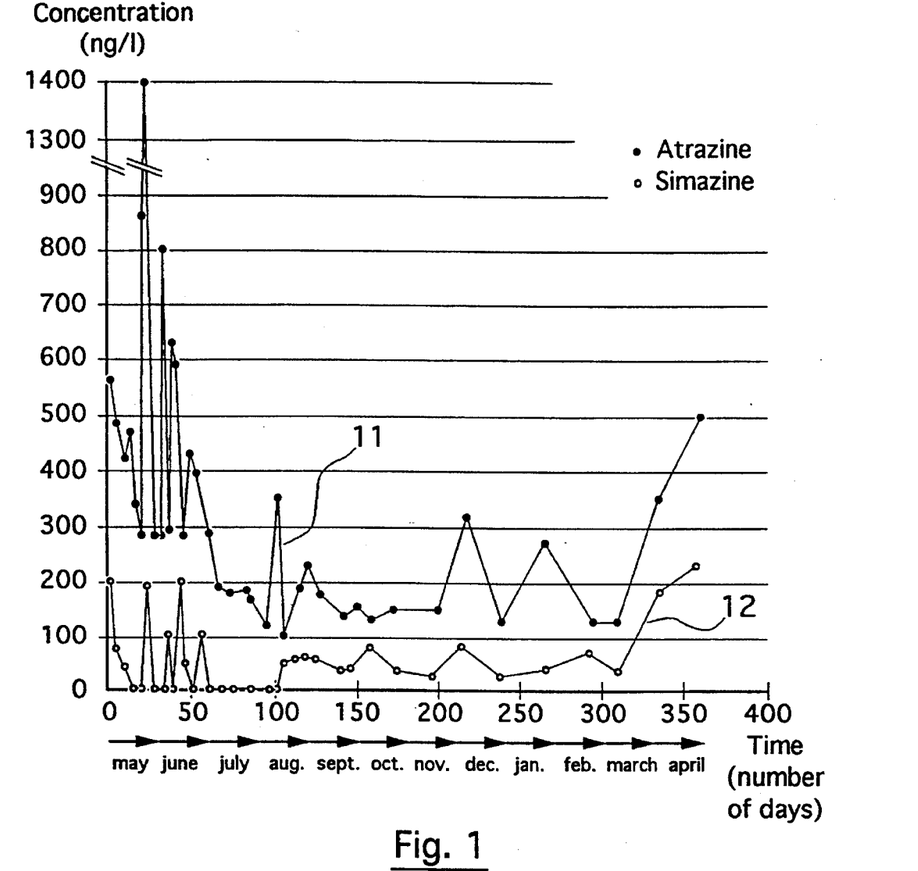
FIG. 1 shows the curves of variation of the pesticide concentration of the raw water from a tributary of the Seine, over a period of one year.

For example, FIG. 1 shows the variation in concentration (in ng/l) of two nitrogenous pesticides in raw water from a tributary of the Seine, over a period of one year from May 1989 to May 1990. The curve 11 shows the development of the atrazine concentration and the curve 12 shows the development of the simazine concentration.

Atrazine is a herbicide constituted by 2-chloro-4-ethylamino-6-isopropylamino-s-triazine.

Simazine is the generic name of a family of herbicides having the formula $ClC_3N_3(NHC_2H_5)_2$ or 2-chloro-4,6-bis(ethylamino)-s-triazine.

During tests carried out to treat this tributary with a conventional installation, no satisfactory correlation has been noted between the presence of atrazine and the other characteristic parameters (turbidity, UV254 nm, organic matter, color, pH) of raw water quality. Nor is there any clear relationship between flow-rate of the river and the nitrogenous pesticide content values. The appearance of triazines from April onwards is essentially related to local farming practices and is probably a function of the pluviometry. There is no simple parameter to explain the presence or appearance of nitrogenous pesticides in raw water.

This absence of correlation makes it all the more difficult to regulate elimination treatments.

Given the low concentrations in raw water, the simazine is, barring some exceptions, eliminated satisfactorily by the conventional treatment approach. Atrazine, with a far higher concentration in raw water, is less well eliminated by the conventional approach. The standard specifying 0.1 µg/l in the water treated cannot be complied with for a part of the year.

The removal efficiency obtained during flocculation-settling is very low (with a mean value of 5%). The removal efficiency in the sand filters reaches a mean value of about 20%, probably through the low filtration speed (3.3 m/h). After the final step of ozonization in the plant, the overall elimination efficiency has a mean value of only 30% for atrazine. The final ozonization step has, however, a low treatment rate of 0.85 $mgO_3/l$. With an ozonization rate of 2 $mgO_3/l$, the mean efficiency of elimination of atrazine reaches almost 60% (on a prototype): with a combination of ozone +hydrogen peroxide, this efficiency may reach 90%.

However, in these situations, the "concentration peaks" can be absorbed only with a regulation system.

An aim of the invention is to overcome these drawbacks by proposing a new principle of a treatment plant applicable notably to the treatment of raw water with a high variability in microcontaminants.

More specifically, a first aim of the invention is to provide a plant for the treatment of surface water that has a reliable retention capacity with respect to microcontaminants, for a wide range of micropollution (including radioactive micropollution), and with respect to situations with a high rate of variability.

Another aim of the invention is to provide a treatment plant such as this at an optimized cost price.

Another aim of the invention is to provide a treatment plant such as this that can be applied to several kinds of surface water, ranging from airport runway wash water to mine drainage water.

These aims, as well as others that shall appear hereinafter, are achieved according to the invention by means of a plant for the treatment of surface water liable to display high variability in quality, notably with a view to making it potable, wherein said plant comprises:

- a safety barrier mounted at the exit from the treatment plant and constituted by a physical filter providing, at the exit from said filter, a predetermined minimum quality irrespectively of the quality of the water on entry into said filter;
- a pre-treatment installation located upstream from said safety barrier, the treatment intensity of said pre-treatment installation being adjusted so as to obtain a predetermined optimal quality of water on entry into said safety barrier, as a function of an information element on the current quality of water given by measuring means located at the entrance to said physical barrier.

The measuring means are, for example, located at a protective prefiltering cartridge located immediately upstream from said safety barrier. These measuring means belong preferably to the group comprising sensors of turbidity, pH, resistivity, T.O.C., load loss in said filter and UV adsorption.

According to a particularly interesting variant, said measuring means are constitued by a T.O.C. sensor.

For, a correlation has been observed between the organic matter content of the pre-treated water reaching said safety barrier and the percentage of elimination of the microcontaminants. Quite surprisingly, it would appear that if the organic matter content of the water reaching the filter is too low, then the reduction of the microcontaminants would be less efficient than would have been the case if this organic matter content were to be regulated, by means of a T.O.C. sensor, in a range of optimum values providing for efficient clarification while, at the same time, enabling very thorough elimination of the microcontaminants.

In other words, there is an interaction between the organic matter and the elimination of the microcontaminants.

The origin and the mechanisms of this interaction are not known with precision. It may be reasonably assumed that the organic matter remaining in the filtered water enables couplings with the molecules of microcontaminants resulting in the formation of complexes that possess a substantial degree of steric geometric and are likely to be stopped more easily by a filtration membrane. Besides, when the organic matter, which is naturally charged negatively, is bound with microcontaminants, it contributes to furthering the repulsion of these microcontaminants by the filtration membrane, which is also charged negatively.

The invention also relates to a method for the application of said treatment plant, which can be used to obtain a very thorough elimination of the microcontaminants from the water filtered by said safety barrier. This method consists in adjusting the organic matter content in the water reaching said safety barrier so as to fix this content within a range of optimum values for the elimination of the microcontaminants.

This method runs counter to the methods implemented up till now, which have all tended to orient the treatment of the water towards as thorough a clarification as possible in conjunction with the most thorough possible elimination of the microcontaminants from this water thus clarified. In quite an original manner, the invention proposes to clarify the water designed to be filtered while at the same time adjusting the quantity of organic matter in this water in order to optimize the elimination of the microcontaminants.

According to one variant of the invention, the step of the method consisting in adjusting the organic matter content of the water reaching said safety barrier is carried out by the addition, to the pre-treated water, of a given quantity of organic matter enabling the fixing of the organic matter content in said range of optimum values.

Advantageously, the step consisting in adjusting the organic matter content is accompanied by a step consisting in the addition of at least one non-oxidizing biocide compound to the water reaching said safety barrier. This non-oxidizing biocide compound makes it possible to eliminate the micro-organisms that could benefit from the presence of the added organic matter and that increase the risks of clogging of the membrane, while at the same time not destroying the membrane or the organic matter used to optimize the elimination of microcontaminants. As a non-oxidizing biocide compound it is possible to use, notably, micro-traces of silver.

According to a particularly promising aspect of the invention, said added organic matter may be constituted at least partly by at least one biocide compound. This biocide fulfils a dual role. Firstly, it contributes to improving the elimination of the microcontaminants and, secondly, it enables the elimination of the microorganisms harmful to the functioning of the membrane.

According to another aspect of the invention, said added organic matter may be constituted by at least one anionic, cationic or non-ionic polymer, used in the water clarification phase, at a rate such that it also furthers the elimination of the microcontaminants. The increasing of the polymer content thus provides for efficient clarification of the water with a reduced mineral coagulant content, thus preventing the organic material from being eliminated with excessive thoroughness, the polymer furthermore being itself capable of constituting this desired medium of organic matter.

The pre-treatment installation preferably comprises:

either a clarification unit of the type formed by a flocculation/settling/sand filtration sequence;

or a microfiltration and/or ultrafiltration installation;

or both of the above units, inserted selectively, together or separately in said pre-treatment installation as a function of the information given by the measuring means.

According to an essential characteristic of the invention, the safety barrier is constituted by a nanofiltration membrane with a retention capacity of the order of 200–300 (in terms of molecular weight), advantageously used at low pressure of the order of 4 to 30 bars, preferably 5 to 10 bars.

According to another variant of the invention, said safety barrier is constituted by a first membrane having a first retention capacity, coupled to at least one second membrane having a second retention capacity greater than said first retention capacity, said second membrane being mounted in "series-rejection" mode downstream from said first membrane, the general filtrate produced by said safety barrier being formed by the conjunction of the filtrates coming out of all of said membranes.

Other features and advantages of the invention shall appear from the following description of a preferred embodiment of the invention, given by way of a non-restrictive illustration, and from the appended drawings, of which:

The general principle of the invention consists in the implementation of a treatment plant formed by the following combination:

the placing of a safety barrier at the exit from the treatment plant;

the carrying out of a pre-treatment operation upstream from said safety barrier so that, in steady operation, very high quality water is obtained on entry into the safety barrier.

Advantageously, the safety barrier is constituted by a physical filter in the form of a nanofiltration membrane. Membranes of this type are marketed, for example, under the name FILMTEC (trade name) by the American firm Dow Chemical. For example, the references NF40 or, again, NF70, may be used.

One type of membrane that can be used in the invention is also described notably in the U.S. patent documents U.S. Pat. Nos. 4,259,183, 4,765,847 and 4,824,574.

Conventionally, this type of membrane is generally used to implement methods of reverse osmosis, under relatively high pressures (of the order of 30 bars), notably to desalinate sea water. In these applications, the main goal is the filtration of ion compounds of the water to be treated.

In general, these membranes are negatively charged electrically and play a repelling role with respect to the cations contained in the liquid to be treated.

In the novel use of the invention, at the exit from the treatment plants, the nanofiltration membrane is used to eliminate microcontaminants, notably organic matter, especially for the smoothing of untreated concentration peaks in the pretreatment installation.

The most adequate type of membrane has a retention capacity for molecules with a molecular weight of over 200–300.

To make the nanofiltration membranes work efficiently, it is important to provide the pretreatment installation located upstream with a goal of strict quality. In particular, at least one of the following two conditions should be met in steady operation:

the fouling should be lower than about 3 (in terms of silt density index): this is the main criterion;

the turbidity of the water on entry into the membrane should be lower than about 0.3 (in terms of nephelometry turbidity units).

This means that the pre-treatment should be accurately controlled. For, the fouling of the membrane is caused notably by particles and colloidal constituents which get concentrated on the surface of the membrane and can be eliminated solely by chemical cleaning.

Figure 2:
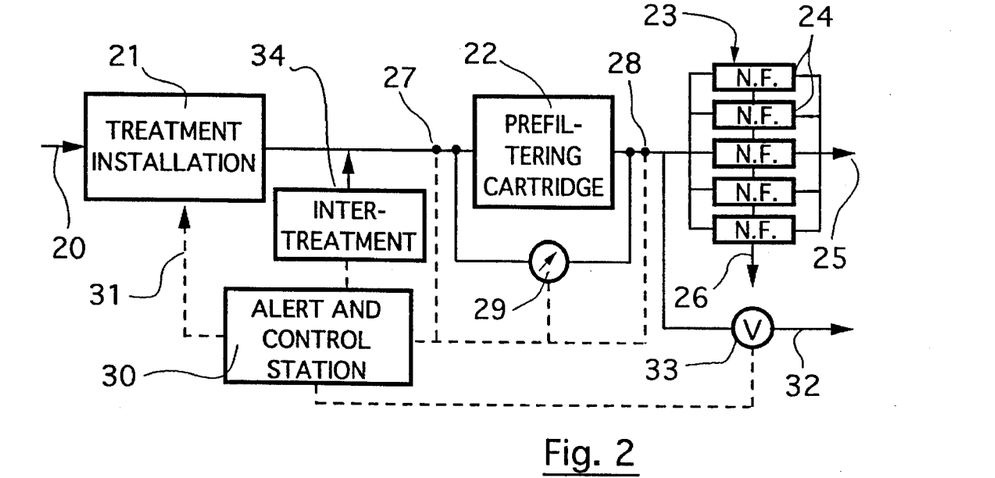
FIG. 2 shows a schematic view of a treatment plant according to the invention.

FIG. 2 gives a schematic view of a treatment plant according to the invention.

The raw water 20 is pre-treated in a pre-treatment installation that meets the requisite goals of quality.

The pre-treated water then goes through a cartridge 22 before being filtered by the safety barrier 23 constituted by a battery of nanofiltration membranes 24 in parallel. These nanofiltration membranes are tangential membranes, and give the filtrate 25, in rejecting the unfiltered water 26 which may be recycled.

Naturally, the residue 26 should undergo all the adequate treatment operations, depending on its subsequent use, for example by ozone/peroxide type or again ozone/catalytic type coupling operations.

In one particular embodiment, a granular active carbon filtration unit may be mounted downstream from the nanofiltration membranes 24. Nanofiltration makes it possible essentially to eliminate all molecules with a molecular weight of over 200–250. However, the permeate still contains molecules of this type in the trace state. For tests have, for example, revealed the presence of refractory organic carbon in a concentration of 0.1 to 0.3 mg/l. The coupling of the microfiltration unit 24 with a G.A.C treatment unit downstream from the membranes makes for an efficacious improvement in the elimination of this type of micropollution, since G.A.C fully plays the role of a specific adsorbent of this type of molecule.

The treatment plant advantageously comprises sensors 27, 28, 29 interposed between the pre-treatment installation 21 and the battery 23 of nanofilters 24.

These sensors may be of any type enabling the detection of an insufficiency of the pre-treatment action, i.e. for example a risk of fouling or an unusual pollution peak. These sensors are, for example, sensors of turbidity, pH, resistivity, T.O.C., and U.V. adsorption, or particle counters etc.

The sensor 29 is advantageously a load loss sensor in the protective prefiltering cartridge 22.

The information elements coming from the sensors 27, 28, 29 are fed to an alert and control station 30. The station 30 may advantageously deliver a signal 31 for the servo-control of the pre-treatment installation 21 as a function of the measurement information elements from the sensors 27, 28, 29.

Advantageously, the sensors 27, 28 also include a pH sensor and/or a sensor of concentration of certain critical salts. Thus, it is possible to make periodic or permanent measurements of the barium content of the pre-treated water. For there is a risk that the barium salts (notably the sulfates) will precipitate, when they are present in an excessively high concentration, for a given pH value, and that they will hence foul the nanofiltration membranes.

This is also the case when there is an excessively high concentration of other mineral salts or of other substances.

Then through the control station 30, the measurements of concentration and of pH may be used to control either specific modules of the pre-treatment installation 21 or specific "intertreatment" means 34.

These intertreatment means 34 are used, for example, to inject acidifying or sequestering type chemical reagents known to those skilled in the art.

Furthermore, should the values measured go beyond a predetermined threshold of risk without any possibility of a palliative, provision may be made to put the nanofiltration membrane out of circuit by a bypass conduit 32 comprising a "bypass" valve 33 servo-controlled by the alert and control unit 30.

Other criteria of risk thresholds for the fouling or destruction of the membrane 24 may also activate the putting of said membrane out of circuit, as could be determined by those skilled in the art.

Figure 3:
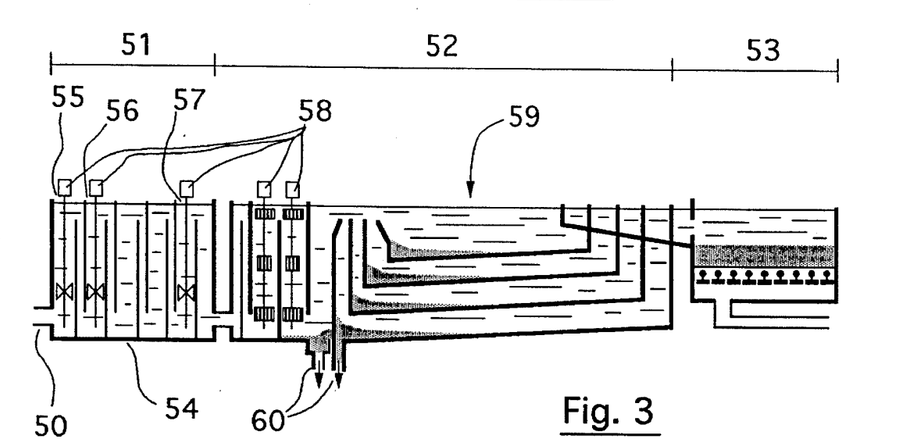
FIG. 3 shows a pre-treatment installation according to the invention that can be used in the treatment plant of FIG. 2.

FIG. 3 shows an exemplary treatment installation that can be used in the treatment plant of FIG. 2.

The water to be treated 50 undergoes a process of three steps successively:

an initial pre-treatment step 51, a flocculation-settling step 52, a sand filtration step 53.

The initial pre-treatment 51 is essentially a coagulation prompted by chemical reagents introduced into a treatment vessel with four compartments. The order in which the reagents are introduced is determined so as to prevent interference.

Advantageously, the reagents introduced into the vessel 54 are successively a coagulant 55, make-up reagents 56 such as chlorine dioxide, soda, sodium hypochlorite (in the event of pollution by manganese), active carbon in powder form 57, essentially to cope with pollution by non-biodegradable substances that can be easily eliminated by adsorption.

Coagulation is a physical/chemical action aimed at modifying the state of the particles contained in the raw water and chiefly colloidal particles negatively charged with electricity. In the water, these particles tend to exert a repelling electrical effect. To enable their elimination by settling, it is therefore necessary to neutralize their electrical charges by adding a positively ionized coagulant. This coagulant, for example aluminium polychloride or ferric chlorosulfate (FCS), enables the immediate formation of very fine flakes.

The different compartments of the tank 54, as well as the entrance to the flocculation-settling module include shakers 58.

At the step 52, the object of the flocculation is to enlarge the flakes and increase their weight. Furthermore, the settling is aimed at the elimination, solely by the effect of gravity, of the major part of the flakes formed during the previous stages. It is carried out in settling corridors 59, made of prestressed concrete, comprising three or four superimposed compartments.

The sludge is eliminated by discharge conduits 60.

In the last step 53, after the settling, the water is let into sand filters. As a non-restrictive example, it is possible to use filters comprising a layer of filtration sand with a thickness of the order of 50 cm to 1.50 mm, for an effective grain size of less than 0.8 mm, preferably less than 0.5 mm.

The treatment operations shown in FIG. 3 by way of an example correspond to open filters but, preferably, closed filters will be used. The intertreatment by injection of the chemical reagent is then done at the exit from this filtration step 53.

In another embodiment (not shown), the pre-treatment installation may also be constituted by microfiltration or ultrafiltration batteries.

It is also possible to envisage, for example, the selective insertion of the ozone-carbon approach of FIG. 3 and/or the microfiltration or ultrafiltration installation, under the control of the alert and control station 30 of FIG. 2 as a function of the quality of the pre-treatment installation 21.

The treatment plant of the invention can be applied to a great number of possible cases.

It is, for example, well suited to the elimination of sulfates from the drainage water of irons mines that have been closed down. For, in this type of mine, instances of rising water are observed, with the solubilization of the pyrites. A high sulfate content is then detected, which calls for a desulphurization treatment. The nanofiltration membrane used as a safety barrier is well suited to this type of treatment.

Figure 4:
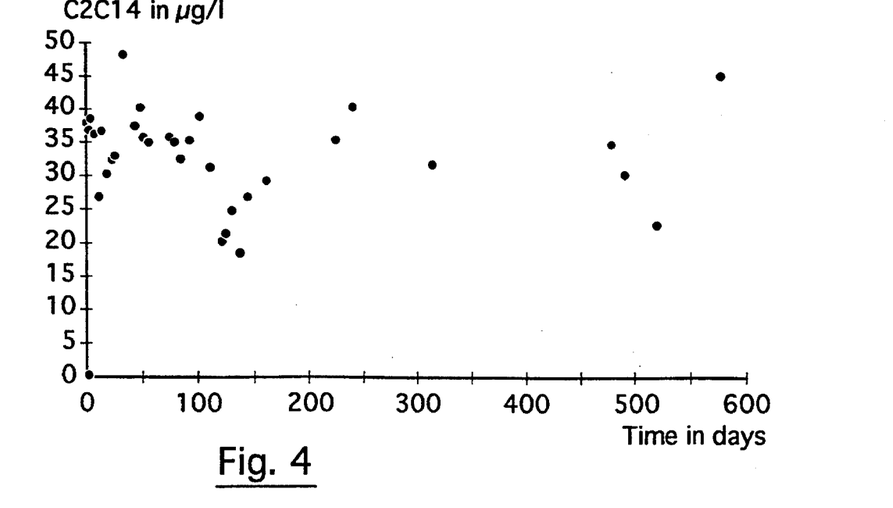
FIG. 4 exemplifies a curve of variation, in time, of the tetrachloroethylene concentration in the raw water of a catchment well to which the treatment plant of the invention can be applied.

FIG. 4 shows another possible case of water displaying high variability of micropollution by tetrachloroethylene.

The water used for the tests is of subterranean origin. The catchment structure is a well about 10 m deep. The pumping flow rate is 80 $m^3/h$ and the population served is about 6,000. The production capacity of the plant reaches a maximum of 1,800 $m^3$/day.

The quality of the water is quite in keeping with the prevailing French standards and with the E.E.C. standards. This water is mineralized to a medium extent, and is in a state of calcium-carbon equilibrium.

The trichloroethylene pollution undergoes changes during the year between values of 20 µg/l and 50 µg/l approximately. The operation for the elimination of this variable micropollution may be done optimally by using a treatment plant according to the invention.

A specific advantageous application of the treatment plant of the invention relates to the fight against radioactive pollution. Radioactive pollution, notably pollution by radon, is essentially concentrated in the colloids. Consequently, a nanofiltration membrane, used as a safety barrier, constitutes an efficient protection, by the retention of the radioactive particles. This method is notably far surer than that of filtration by granular active carbon which slowly releases the radioactive pollution after having acted as a barrier.

Another specific advantageous application is that of the elimination of biodegradable dissolved organic carbon. In the conventional operations of treatment by the ozone-carbon approach, the control of organic pollution is organized as follows: the ozone breaks the big organic molecules, and the granular active carbon retains the resulting molecular chains. However, there always remains residual organic carbon at the exit. The use of a nanofiltration membrane constitutes an efficient safety barrier for the retention of this residual organic carbon.

Comparative tests have been carried out and have given the results presented here below.

|  | PRE-TREATMENT BY SAND FILTRATION | ADDITIONAL PRE-TREATMENT BY NANOFILTRATION |
| --- | --- | --- |
| Total DOC of the filtrate (mg/l) | 2.9 | 0.3 |
| of which: Biodegradable DOC (mg/l) | 0.6 | <0.1 |
| of which: refractory DOC (mg/l) | 2.3 | 0.3 |

The first column gives the DOC (dissolved organic carbon) rate measured on a test specimen of treated water at the exit from a treatment unit using sand filtration. The analysis of the filtrate reveals a level of 2.9 mg/l constituted by 0.6 mg/l of biodegradable DOC (analyzed by a specific test of biodegradability) and 2.3 mg/l of (non-biodegradable) refractory DOC.

The same water then undergoes a complementary nanofiltration treatment. The total DOC after nanofiltration drops considerably (0.3 mg/l) with a total disappearance of biodegradable DOC (<0.1 mg/l, the limit of resolution of the biodegradability test). This result is extremely favorable since biodegradable DOC is a source of bacterial development in the system downstream from the installation.

Figure 5:
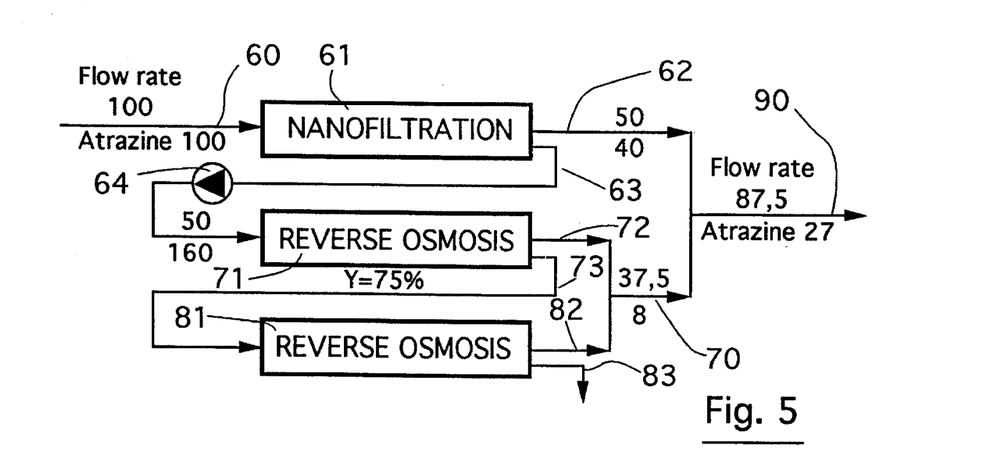
FIG. 5 shows a schematic view of a particular embodiment of the safety barrier of the invention, constituted by a nanofiltration membrane associated with two reverse osmosis membranes in "series-rejection" mode.

FIG. 5 gives a schematic view of a specific arrangement of nanofiltration and reverse osmosis membranes that can be used as a safety barrier.

As shown, this arrangement consists in using a tangential nanofiltration membrane, forming a first filtration stage, and in causing it to be followed by at least one reverse osmosis membrane mounted in "series-rejection" mode downstream from said nanofiltration membrane. The filtrate coming from the safety barrier is then constituted by the junction of filtrates coming from all the nanofiltration and reverse osmosis membranes.

More specifically, in the embodiment of FIG. 5, a nanofiltration membrane 61 receives an input of water 60 to be treated and gives a filtrate 62 and a concentrate 63. The concentrate is pumped by means of the pump 64 towards a first reverse osmosis membrane 71 which gives a filtrate 72 and a concentrate 73. The concentrate 73 is, in turn, sent towards a second reverse osmosis membrane 81, producing a filtrate 82 and a concentrate 83.

The safety barrier thus formed gives a total filtrate 90 constituted by the conjunction of the filtrates 62, 72 and 82 coming from the membranes 61, 71 and 81. The general concentrate 83 is discharged, for example, towards a subsequent treatment unit.

The nanofiltration membrane 61 is of the type shown further above. The reverse osmosis membranes 71 and 81 may advantageously have the same general principle of constitution as the nanofiltration membrane 61, but with mechanical characteristics and a retention capacity that enable more intensive osmotic functioning.

The nanofiltration membrane 61 is defined, for example, as a membrane having a retention capacity that enables the retention of the organic micropollution (retention capacity, with rejection at more than 95%, of the order of 1 nm to 10 nm approximately, 1 nm corresponding to molecular weights of the order of 200 approximately); the reverse osmosis membranes make it possible to retain the ions (retention capacity of 100 angstroms to 1 nm approximately). However, more generally, the configuration of FIG. 4 is suitable inasmuch as the first stage 61 has a retention capacity that is lower than that of the following stages 71, 81.

The configuration thus presented has a first advantage from the viewpoint of feed pressures. The nanofiltration membrane 61 is fed, for example, at about 8 bars. Owing to the load losses in the feed chamber of the membrane 61, the concentrate 63 is at a slightly lower pressure, for example of the order of 6.5 bars. To raise the pressure of the concentrate up to a value compatible with the osmotic treatment in the membranes 71, 81, it is then enough to have a pump 64 that induces a pressure differential of about 8.5 bars to attain the value of 15 bars approximately, needed for the reverse osmosis.

Thus, a saving of electrical energy is got owing to the recovery of the hydraulic energy of the concentrate 63 of the nanofiltration stage 61.

This arrangement makes it possible to improve the efficiency of elimination of the microcontaminants retained in this type of membrane. Thus, if we take the case of pesticides (atrazine etc.) or fluorine, the removal efficiency of which is about 60% in nanofiltration, and if each of the membranes 61, 71, 81 is considered to have a conversion factor of the order of 50% (in the case of six-element tubes), the following flow-rates and atrazine concentration values are obtained successively:

for a flow-rate of 100 and an atrazine concentration of 100 on entry into the nanofiltration membrane 61, a filtrate 62 is obtained with a flow-rate of 50 and a concentration of 40, by the application of a value of 50% for the conversion factor of the stage, and a value of 60% for the atrazine removal efficiency;

on entry into the second stage 71, the flow-rate is also equal to 50 (flow-rate of the concentrate 63) and the atrazine concentration has risen to 160. If we consider an atrazine removal efficiency of the order of 95% on both the stages of the reverse osmosis membranes 71 and 81, with a total conversion factor of the order of 75%, a total filtrate 70 is obtained with a flow-rate of 37.5 and a concentration of 8. The general concentrate 83 has a flow-rate of 12.5.

The conjunction of the filtrate 62 of the nanofiltration membrane 61 and of the filtrate 70 of the two reverse osmosis stages 71, 81 then gives a general filtrate with a flow-rate of 87.5 with an atrazine concentration equal to 27.

In other words, a safety barrier has been set up with an overall conversion factor of 87.5% with an atrazine removal efficiency of 73%, which corresponds to an improvement of nearly 22% of the removal efficiency with respect to the use of a single nanofiltration stage 61.

This configuration is also advantageous in comparison with the technique using only reverse osmosis. Indeed, the arrangement of FIG. 5 makes it possible to avoid the excessive demineralizing of the permeate, owing to the presence of the nanofiltration filtrate 62.

Furthermore, this arrangement makes it possible to optimize the nanofiltration stage 61, by giving it a low conversion rate, thus improving the removal efficiency of the microcontaminants. The fact of providing for a nanofiltration operation on only one stage makes it possible also to adjust the feed pressure to the precise value needed for the feeding of the stage, and not for the feeding of the other stages. Similarly, the fact of providing for two reverse osmosis stages 71, 81 makes it possible to feed them by means of a single complementary pump 64.

Finally, the treatment thus made generally makes it possible to avoid a final post-treatment (conventionally $H_2O_2$ and/or $O_3$ and/or GAC) owing to the improvement of the removal efficiency.

used in water from which the organic matter has been eliminated to the maximum extent.

| Compounds studied | Molar mass (g/mol) | raw water µg/ | | permeate µg/l | | % of elimination | |
|---|---|---|---|---|---|---|---|
| | | with lauryl | no lauryl | with lauryl | no lauryl | with lauryl | no lauryl |
| Bromoform | 252 | 8,7 | 47,8 | 0,0 | 6,0 | 100 | 87 |
| | | 12,1 | 87,0 | 0,0 | 4,4 | 100 | 95 |
| | | 10,8 | 88,0 | 0,0 | 7,5 | 100 | 91 |
| Trichlorotri-fluoroethane | 187 | 3,9 | 6,7 | 0,7 | 7,1 | 82 | 0 |
| | | 6,7 | 18,5 | 1,6 | 3,4 | 76 | 82 |
| | | 9,8 | 31,4 | 1,9 | 82,0 | 81 | −160* |
| Tetrachloro-ethylene | 166 | 0,4 | 4,8 | 0,0 | 1,20 | 100 | 75 |
| | | 0,8 | 10,5 | 0,0 | 0,16 | 100 | 98 |
| | | 1,3 | 14,6 | 0,0 | 0,16 | 100 | 100 |
| Trichloro 1,1,1 ethane | 133 | 4,5 | 6,5 | 1,7 | 6,3 | 62 | 3 |
| | | 7,8 | 16,7 | 3 | 4,4 | 62 | 74 |
| | | 11,4 | 22,6 | 3,6 | 8,6 | 68 | 62 |
| Chloroform | 119 | 5,6 | 31,2 | 0,7 | 11,2 | 88 | 64 |
| | | 8,9 | 3,4 | 1,3 | 4,7 | 85 | −38* |
| | | 7,9 | 25,6 | 2,3 | 9,0 | 71 | 65 |

*the negative results correspond to salting-out phenomena

In all, the safety barrier thus presented no longer corresponds either to nanofiltration or to reverse osmosis but to an intermediate separating technique.

According to another embodiment of the invention, the rejection of microcontaminants can be improved.

By replacing one of the sensors 27, 28 or 29 of the above-described example by a T.O.C. sensor that measures the total organic charge, it is possible to adjust the organic matter content of the water arriving at the nanofiltration membrane 61 so that this water has a sufficient organic matter content that enables it to increase the rate of elimination of the microcontaminants. By adjusting the organic matter content of the water coming from the sand filtration step 53 to 3.6 mg/l, it is possible to obtain a 92.5% removal of simazine, whereas a thorough clarification, which can be used to obtain a value of organic matter content of 0.5 mg/l at the exit from the sand filtration step 53 enables a removal rate of only 68% (see table below).

| T.O.C | Simazine content: raw water | Simazine content: permeate | Simazine content: concentrate | % of removal |
|---|---|---|---|---|
| 3,6 mg/l | 0.8 µg/l | 0.06 µg/l | 2.87 µg/l | 92.5 |
| 0,5 mg/l | 0.265 µg/l | 0.085 µg/l | 1.24 lag/l | 68 |

The organic matter content may be adjusted, either by acting on the operation of the pre-treatment plant 21 in such a way that it results in pre-treated water with a sufficient content of organic matter or by adding organic matter to the pre-treated water, for example in the form of at least one biocide compound or an excess of polymer. In this respect, sodium laurylsulphate (sodium dodecylsulphate) has proved to be particularly interesting as a compound for boosting the elimination of numerous microcontaminants. The following table shows that this compound thus contributes to the total elimination of certain organochlorine contaminants such as bromoform and tetrachloroethylene.

The percentages of removal of the microcontaminants thus obtained are greater than those obtained with the most efficient nanofiltration membranes such as the membrane NF70 marketed by the firm DOW CHEMICAL, when it is

What is claimed is:

1. A treatment plant for treating a surface water, the water displaying a high variability in quality, for making the surface water potable, said treatment plant comprising:

a safety barrier mounted at an exit from the treatment plant and constituted by a physical filter providing, at the exit from said physical filter, a predetermined minimum quality regardless of any quality of the surface water on entry into said physical filter, the safety barrier including at least one nanofiltration membrane; and a pre-treatment installation located upstream from said safety barrier and means for adjusting treatment intensity of said pretreatment installation so as to obtain a predetermined optimal quality of water having an organic content within a range of optimal values without totally eliminating the organic content of the water on entry into said safety barrier, as a function of an information element on current quality of water given by measuring means located at an entrance to said safety barrier.

2. A treatment plant according to claim 1, wherein said predetermined optimal quality of water corresponds to at least one of the following two criteria:

silt density index (SDI) being approximately larger than 3;

turbidity (NTU) being approximately smaller than 0.3.

3. A treatment plant according to claim 1 wherein said measuring means is located at a prefiltering cartridge located immediately upstream from said safety barrier.

4. A treatment plant according to claim 1 wherein said measuring means belong to the group consisting of sensors of turbidity, pH, resistivity, T.O.C., load loss in said prefilter cartridge and UV absorption and sensors for measurement of a barium content and combinations thereof.

5. A treatment plant according to claim 4, wherein said measuring means comprises a T.O.C. sensor.

6. A treatment plant according to claim 1 wherein said pre-treatment installation comprises a sand filtration unit, sand particles of which have an effective grain size of less than 0.8 mm.

7. A treatment plant according to claim 6 wherein information given by the measuring means activates selective insertion, in said pre-treatment installation, either of said sand filtration unit installation, or of a clarification unit installation, or of an ultra filtration installation.

8. A treatment plant according to claim 1 wherein said pre-treatment installation comprises a clarification unit formed by a flocculation/settling/sand filtration sequence.

9. A treatment plant according to claim 1 wherein said pre-treatment installation comprises either a microfiltration or ultrafiltration installation.

10. A treatment plant according to claim 1 wherein said measuring means controls an emission of an alerting signal.

11. A treatment plant according to claim 1 wherein the safety barrier comprises at least one membrane having a retention capacity with respect to molecules having a molecular weight of more than 200–300.

12. A treatment plant according to claim 1 wherein said safety barrier includes a first membrane of said at least one nanofiltration membrane having a first retention capacity, coupled to at least one second membrane having a second retention capacity greater than said first retention capacity, said at least one second membrane being mounted in "series-rejection" mode downstream from said first membrane, filtrate produced by said safety barrier being formed by a conjunction of filtrates coming from the first membrane and the at least one second membrane.

13. A treatment plant according to claim 1, wherein said at least one nanofiltration membrane is used at low pressure of 4 to 30 bars.

14. A treatment plant according to claim 1, wherein a granular activated carbon filtration unit is mounted downstream from said safety barrier.

15. A treatment plant according to claim 1, wherein said safety barrier is associated with a bypass conduit enabling said at least one nanofiltration membrane to be bypassed upon detection of a water quality that is above a predetermined threshold of risk of clogging or of destruction for the at least one nanofiltration membrane.

16. A treatment plant according to claim 1 comprising means for injecting chemical reagents upstream from said safety barrier in response to a measurement of pH or of a predetermined saline concentration.

17. A treatment plant according to claim 1, wherein a residue retained by said at least one nanofiltration membrane is treated by ozone/peroxide coupling or ozone/catalytic treatment coupling.

18. A method for treating a surface water having an organic matter content to make the surface water potable by a treatment plant comprising the steps of:
providing the treatment plant for treating the surface water, the water displaying a high variability in quality, said treatment plant comprising:
a safety barrier mounted at an exit from the treatment plant and constituted by a physical filter providing, at the exit from said physical filter, a predetermined minimum quality regardless of any quality of the surface water on entry into said physical filter, the safety barrier including at least one nanofiltration membrane; and
a pre-treatment installation located upstream from said safety barrier, treatment intensity of said pre-treatment installation being adjusted so as to obtain a predetermined optimal quality of water on entry into said safety barrier, as a function of an information element on current quality of water given by measuring means located at an entrance to said safety barrier, the pre-treatment installation comprising a clarification unit formed by a flocculation/settling/sand filtration sequence;
pre-treating the surface water at the upstream from the safety barrier; and
adjusting the safety barrier when the organic matter content in the surface water reaches the safety barrier so as to fix the organic matter content within a range of optimum values for eliminating microcontaminants.

19. A method according to claim 18, wherein said step of adjusting the organic matter content of the surface water reaching said safety barrier is carried out by maintaining a natural organic matter content in the surface water pre-treated by said pre-treatment installation within said range of optimal values.

20. A method according to claim 18, wherein said step of adjusting the organic matter content of the surface water reaching said safety barrier is carried out by adding, to the pre-treated water, a given quantity of organic matter enabling to fix the organic matter content in said range of optimum values.

21. A method according to claim 20, wherein said step of adjusting the organic matter content is accompanied by a step of adding at least one non-oxidizing biocide compound to the surface water reaching said safety barrier.

22. A method according to claim 20, wherein said added organic matter includes at least one biocide compound.

23. A method according to claim 20, wherein said added organic matter is selected from the group consisting of anionic, cationic non-ionic polymers, and mixtures thereof, used in a surface water clarification phase, at a rate such that the added organic matter also furthers elimination of the microcontaminants.

24. A method for treating a surface water against radioactive micropollution by a treatment plant as a protection barrier, comprising the steps of:
providing the treatment plant for treating the surface water, the water displaying a high variability in quality, said treatment plant comprising:
a safety barrier mounted at an exit from the treatment plant and constituted by a physical filter providing, at the exit from said physical filter, a predetermined minimum quality regardless of any quality of the surface water on entry into said physical filter, the safety barrier including at least one nanofiltration membrane; and
a pre-treatment installation located upstream from said safety barrier, treatment intensity of said pre-treatment installation being adjusted so as to obtain a predetermined optimal quality of water on entry into said safety barrier, as a function of an information element on current quality of water given by measuring means located at an entrance to said safety barrier;
pre-treating the surface water at the upstream from the safety barrier; and
adjusting treatment intensity of the pre-treatment installation so as to obtain the predetermined optimal quality of water having an organic content within a range of optimal values without totally eliminating the organic content of the water the entry into the safety barrier.

25. A method for treating a surface water against dissolved organic carbon by a treatment plant as a protection barrier, comprising the steps of:
providing the treatment plant for treating the surface water, the water displaying a high variability in quality, said treatment plant comprising:

a safety barrier mounted at an exit from the treatment plant and constituted by a physical filter providing, at the exit from said physical filter, a predetermined minimum quality regardless of any quality of the surface water on entry into said physical filter, the safety barrier including at least one nanofiltration membrane; and a pre-treatment installation located upstream from said safety barrier, treatment intensity of said pre-treatment installation being adjusted so as to obtain a predetermined optimal quality of water on entry into said safety barrier, as a function of an information element on current quality of water given by measuring means located at an entrance to said safety barrier;

pre-treating the surface water at the upstream from the safety barrier; and adjusting treatment intensity of the pre-treatment installation so as to obtain the predetermined optimal quality of water having an organic content within a range of optimal values without totally eliminating the organic content of the water on the entry into the safety barrier.

* * * * *

UNITED STATES PATENT AND TRADEMARK OFFICE
CERTIFICATE OF CORRECTION

PATENT NO. : 5,460,723

DATED : 24 October 1995

INVENTOR(S) : Bourbigot, et al.

It is certified that error appears in the above-identified patent and that said Letters Patent is hereby corrected as shown below:

Column 2, line 12, insert --.-- after "stable".

Column 4, line 1, "leis" should be --less".

Column 11, line 50, "1.24lag/1" should be --1.24 ug/1--.

Column 13, line 2 (Claim 7), insert --a-- after "activates".

Column 14, line 62 (Claim 24), insert --on-- after "water".

Signed and Sealed this

Fifteenth Day of October, 1996

Attest:

BRUCE LEHMAN

Attesting Officer

Commissioner of Patents and Trademarks